US009069148B2

(12) United States Patent
Herbst

(10) Patent No.: US 9,069,148 B2
(45) Date of Patent: Jun. 30, 2015

(54) DOWNHOLE CABLES WITH BOTH FIBER AND COPPER ELEMENTS

(71) Applicant: AFL Telecommunications LLC, Duncan, SC (US)

(72) Inventor: Brian Herbst, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 13/918,426

(22) Filed: Jun. 14, 2013

(65) Prior Publication Data
US 2013/0279864 A1    Oct. 24, 2013

Related U.S. Application Data

(63) Continuation of application No. 13/656,275, filed on Oct. 19, 2012, now abandoned, which is a continuation of application No. 12/439,412, filed as application No. PCT/US2007/018926 on Aug. 29, 2007, now Pat. No. 8,295,665.

(60) Provisional application No. 60/823,959, filed on Aug. 30, 2006.

(51) Int. Cl.
*G02B 6/44* (2006.01)
*H01B 7/04* (2006.01)
*H01B 13/02* (2006.01)

(52) U.S. Cl.
CPC ......... *G02B 6/4416* (2013.01); *Y10T 29/49194* (2015.01); *Y10T 29/49117* (2015.01); *G02B 6/4488* (2013.01); *G02B 6/449* (2013.01); *H01B 7/046* (2013.01); *H01B 13/02* (2013.01)

(58) Field of Classification Search
CPC .... G02B 6/449; G02B 6/4413; G02B 6/4421; G02B 6/4488; G02B 6/4491; G02B 6/4492
See application file for complete search history.

(56) References Cited

U.S. PATENT DOCUMENTS 2,147,095 A     2/1939  Hochstadter
2,318,601 A *   5/1943  Doble ........................ 374/110
(Continued)

FOREIGN PATENT DOCUMENTS

DE    295 20 915 U1    5/1996
DE    196 03 931 A1    8/1996
(Continued)

OTHER PUBLICATIONS

Russian Office Action dated Mar. 17, 2010 in corresponding Russian Patent Application No. 2008146784/28.
(Continued)

*Primary Examiner* — Rhonda Peace
(74) *Attorney, Agent, or Firm* — Sughrue Mion, PLLC

(57) ABSTRACT

Provided is a method of manufacturing a downhole cable, the method including, forming a helical shape in an outer circumferential surface of a metal tube, the metal tube having a fiber element housed therein, and stranding a copper element in a helical space formed by the metallic tube. Also provided is a downhole cable including, a metallic tube having a helical space in an outer circumferential surface thereof, wherein the metallic tube has a fiber element housed therein, and a copper element disposed in a helical space formed by the steel tube. Double-tube and multi-tube configurations of the downhole cable are also provided.

8 Claims, 7 Drawing Sheets

(56) References Cited

U.S. PATENT DOCUMENTS

| | | | |
|---|---|---|---|
| 2,348,752 A | 5/1944 | Quayle | |
| 2,761,273 A * | 9/1956 | Peterson | 57/212 |
| 3,007,300 A * | 11/1961 | Peterson | 57/311 |
| 3,257,863 A * | 6/1966 | Hanson | 74/502.5 |
| 3,660,590 A | 5/1972 | Conant | |
| 3,750,058 A | 7/1973 | Bankert et al. | |
| 4,087,956 A | 5/1978 | Gre | |
| 4,146,302 A * | 3/1979 | Jachimowicz | 385/111 |
| 4,205,888 A * | 6/1980 | Wade | 439/98 |
| 4,226,504 A | 10/1980 | Bellino | |
| 4,389,088 A * | 6/1983 | Trezequet | 385/111 |
| 4,528,810 A * | 7/1985 | Vogelsberg | 57/294 |
| 4,534,618 A | 8/1985 | Bruggendieck | |
| 4,575,184 A | 3/1986 | Ueno et al. | |
| 4,687,294 A * | 8/1987 | Angeles | 385/102 |
| 4,690,499 A * | 9/1987 | Taylor et al. | 385/111 |
| 4,723,831 A | 2/1988 | Johnson et al. | |
| 4,802,731 A * | 2/1989 | Maschek et al. | 385/101 |
| 4,852,964 A | 8/1989 | Holland et al. | |
| 4,984,869 A * | 1/1991 | Roche | 385/113 |
| 5,222,178 A * | 6/1993 | Betker et al. | 385/110 |
| 5,247,599 A * | 9/1993 | Vyas et al. | 385/113 |
| 5,318,215 A * | 6/1994 | Toya et al. | 228/148 |
| 5,493,626 A | 2/1996 | Schultz et al. | |
| 5,495,547 A | 2/1996 | Rafie et al. | |
| 5,555,338 A | 9/1996 | Haag et al. | |
| 5,666,452 A | 9/1997 | Deitz et al. | |
| 5,767,441 A * | 6/1998 | Brorein et al. | 174/27 |
| 5,956,445 A | 9/1999 | Deitz et al. | |
| 3,035,086 A | 3/2000 | Norman et al. | |
| 6,219,482 B1 * | 4/2001 | Matsuzaki et al. | 385/100 |
| 6,249,629 B1 | 6/2001 | Bringuier | |
| 6,254,924 B1 * | 7/2001 | Brorein et al. | 427/117 |
| 6,396,414 B1 * | 5/2002 | Bickford et al. | 340/855.2 |
| 6,674,946 B2 | 1/2004 | Warden et al. | |
| 7,088,894 B2 * | 8/2006 | Kim et al. | 385/104 |
| 7,269,324 B2 * | 9/2007 | Crownover | 385/137 |
| 7,643,713 B2 * | 1/2010 | Buthe et al. | 385/101 |
| 7,783,147 B2 | 8/2010 | Sutehall et al. | |
| 8,295,665 B2 * | 10/2012 | Herbst | 385/104 |
| 2001/0000930 A1 | 5/2001 | Kim | |
| 2001/0032730 A1 | 10/2001 | Gregor | |
| 2002/0001441 A1 * | 1/2002 | Avellanet | 385/104 |
| 2002/0003935 A1 | 1/2002 | Warden et al. | |
| 2002/0071644 A1 | 6/2002 | Nakajima | |
| 2002/0085819 A1 * | 7/2002 | Stottlemyer et al. | 385/104 |
| 2002/0088931 A1 * | 7/2002 | Danisch et al. | 250/227.14 |
| 2002/0151823 A1 * | 10/2002 | Miyata et al. | 600/585 |
| 2004/0165844 A1 * | 8/2004 | Kim et al. | 385/104 |
| 2005/0067608 A1 * | 3/2005 | Griffioen et al. | 254/134.4 |
| 2006/0045442 A1 | 3/2006 | Varkey et al. | |
| 2006/0072886 A1 * | 4/2006 | Kim et al. | 385/115 |
| 2006/0198585 A1 | 9/2006 | Keller et al. | |
| 2007/0104429 A1 * | 5/2007 | Yokokawa et al. | 385/112 |
| 2010/0008631 A1 | 1/2010 | Herbst | |
| 2011/0048764 A1 * | 3/2011 | Hira et al. | 174/105 R |
| 2011/0280529 A1 * | 11/2011 | Herbst | 385/102 |
| 2013/0039625 A1 * | 2/2013 | Herbst | 385/101 |
| 2013/0209044 A1 * | 8/2013 | Lowell et al. | 385/101 |

FOREIGN PATENT DOCUMENTS

| | | |
|---|---|---|
| EP | 0 945 876 A1 | 9/1999 |
| GB | 2 240 638 A | 8/1991 |
| JP | 2244013 A | 9/1990 |
| JP | 2001311859 A | 11/2001 |
| WO | 98/06109 A1 | 2/1998 |
| WO | 00/72071 A1 | 11/2000 |

OTHER PUBLICATIONS

Russian Office Action dated Sep. 27, 2010 in corresponding Russian Patent Application No. 2008146784/28.

Canadian Office Action issued Jul. 14, 2014 in Canadian Patent Application No. 2,656,843.

* cited by examiner 10-3

DOWNHOLE CABLES WITH BOTH FIBER AND COPPER ELEMENTS

CROSS-REFERENCE TO RELATED APPLICATIONS

This is a continuation of application Ser. No. 13/656,275, filed Oct. 19, 2012, which is a continuation of application Ser. No. 12/439,412 filed Feb. 27, 2009, which is a national stage of PCT/US2007/018926 filed Aug. 29, 2007, which claims priority from U.S. Provisional Application No. 60/823,959 filed Aug. 30, 2006, the disclosures of which are incorporated herein by reference in their entirety.

BACKGROUND OF THE INVENTION

1. Field of the Invention

Apparatuses and methods consistent with the present invention relate to a downhole hybrid cable, and more particularly to a downhole hybrid cable that has both fiber and copper elements.

2. Description of the Related Art

Hybrid cables with fiber and a copper wire are used for various purposes. For example, they are used for supplying power via the copper wire while sensing is carried out on the fiber. Also, sensing can be carried out via the copper wire as well. Such hybrid cables have also been employed in logging cables for downhole use. The logging cables are meant to be put into, for instance, an oil well to collect sample measurements of the well structure. After completion of the measurements, and verifying that the data has been collected, the logging cable is pulled out of the oil well.

The existing technology for downhole hybrid type cables that have both fiber and copper elements includes (1) a center fiber/gel filled stainless steel tube with copper wire wrapped around the tube and an insulation layer around the copper wire/tube configuration which is produced by Gulf Coast Downhole Technologies located in Houston, Tex. Another existing structure (2) has a center insulated copper wire with small plastic fiber/gel filled tubes with an insulation around it. This structure (2) is made by Draka.

The disadvantage of item (1) is that the copper wire 6 is not easily segregated from the stainless steel tube. Attaching sensing elements to the cable when the cable is terminated, i.e. stripped back, is a taxing procedure. The user needs to ensure that the copper wire is separated from the stainless steel tube and it has to be re-insulated as the insulation has to be removed to get to the copper wires. Another disadvantage is that the center stainless steel tube has to be of such a size that the excess fiber length (EFL) in the tube must be relatively low, in the case where a multi-mode optical fiber is deployed in it. This fiber is commonly used for temperature sensing, so it is often used in this type of tube. Single mode optical fiber is also used in well for sensing. It is less sensitive than multi-mode optical fiber so the excess fiber can be slightly higher but given that multi-mode and single mode optical fiber is commonly deployed in the same cable, the excess fiber length will be driven by the multi-mode fiber. If the stainless steel tube is approximately 0.080 inches or smaller, then the EFL can only be 0.10 to 0.15% with respect to the length of the fiber in the core in order to still have good optical performance. This limits the amount of strain that the cable can see before the fiber is also under strain. This can be an issue for environments where the cable temperature will be elevated.

More particularly, in downhole fiber optic cables, a ¼" metal tube is used to house the fiber optic core. With this diameter and the ¼" tube's wall thickness, typically 0.028" or 0.035", the inside diameter of the ¼" metal tube is fixed. This results in the cable designer needing to work in a small space to house the desired copper and fiber elements. In order to fit a 0.080 inch fiber filled stainless steel tube into this ¼" tube and to include copper elements with the appropriate insulation level to ensure proper performance of the copper, the size of the stainless steel tube is limited.

In general, as the stainless steel tube size increases, more excess fiber can be put into it and still have acceptable optical performance (too much excess fiber can create optical loss). Excess fiber is needed in the stainless steel tube to ensure good optical performance during temperature changes in, for example, the oil well. As the temperature increases, the metal expands faster than the fiber, and in the case that there is no excess fiber in the stainless steel tube, the fiber would be under strain as the temperature increased. Increased strain reduces fiber life, can increase attenuation (optical loss), and can affect other attributes on the fiber. In the unitube configuration of item (1), with copper wire wrapped around the tube, the geometry is such that the center stainless steel tube is small, i.e., 0.080 inches or less. This is a drawback to this type of design since the center stainless steel tube size limits the EFL in the tube.

Item (2) overcomes the EFL issues of item number 1 by stranding the plastic tubes around the insulated copper wire. However, due to the size of the plastic tubes, the amount of benefit is limited. The stranding provides for radial movement of the fibers in the tube which increases the amount of cable strain experienced by the plastic tubes before the fiber sees strain. However, with this structure, the disadvantage is that the inherent strength of the structure is limited because the strength element of the structure is only the center copper wire. This becomes problematic as processing tensions on the core and installation practices can result in high tension levels on the cable, thus exposing the fiber to strain. Another disadvantage of item (2) is its crush resistance. The plastic tube is limited in the amount of external force that can be applied to it, in order to still have good optical performance.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a downhole cable that increases a strain free window of the downhole cable.

The present invention also provides a downhole cable which can be elongated by tension or temperature, without excessively straining an optical fiber within an element in the downhole cable.

The above and further objects of the present invention are further accomplished by providing a method of manufacturing a cable including forming a helical shape in an outer circumferential surface of a metal tube, the metal tube having a fiber element housed therein, and stranding a copper element in a helical space formed by the metal tube.

The metal tube may be a fiber gel filled stainless steel tube or it can be free of gel.

According to yet another aspect of the present invention, there is provided a cable including a metal tube having a helical shape in an outer circumferential surface thereof, wherein the metal tube has a fiber element housed therein, and a copper element disposed in a helical space formed by the metal tube.

According to yet another aspect of the present invention, there is provided a method of manufacturing a cable, the method including placing a first metal tube, and a second metal tube parallel to the first metal tube such that a first circumferential surface of the first metal tube is in contact with a second circumferential area of the second metal tube, in a stranding machine, positioning a first copper element and a second copper element in interstitial areas of the first metal tube and the second metal tube, in the stranding machine, and stranding the first metal tube, the second metal tube, the first copper element , and the second copper element together by activating the stranding machine.

The stranding further includes helixing the first metal tube, the second metal tube, the first copper element , and the second copper element together.

Prior to the placing the first metal tube and the second metal tube, the method further includes forming a first helical shape in the first circumferential surface of the first metal tube, and forming a second helical shape in the second circumferential surface of the second metal tube, wherein the stranding further comprises stranding the first copper element in a first helical interstitial space of the first helical shape in the first circumferential surface and the second helical shape in the second circumferential surface, and stranding the second copper element in a second helical interstitial space of the first helical shape in the first circumferential surface and the second helical shape in the second circumferential surface.

The method may further include placing a plastic extrusion on a distal end of the stranded first metal tube, the second metal tube, the first copper element, and the second copper element.

According to yet another aspect of the present invention, there is provided a double-tube cable including a first metal tube, a second metal tube parallel to the first metal tube such that a first circumferential surface of the first metal tube is in contact with a second circumferential area of the second metal tube, and a first copper element and a second copper element disposed in interstitial areas of the first metal tube and the second metal tube.

According to yet another aspect of the present invention, there is provided a multi-tube cable including a copper element, and a plurality of metal tubes stranded around the copper wire, wherein each of the plurality of metal tubes has a fiber element therein, and covering a top end of the copper element and the plurality of metal tubes with an extrusion.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
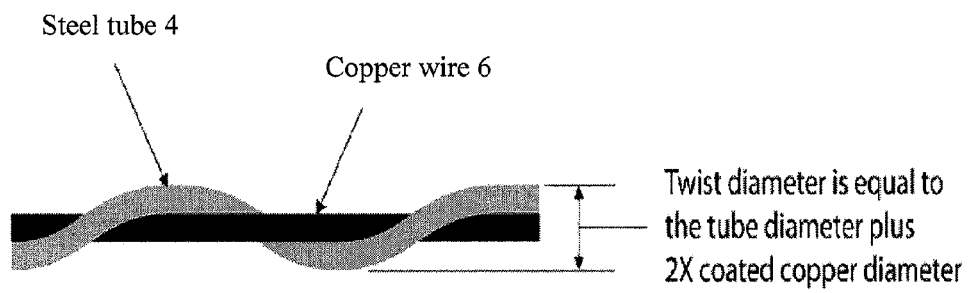
FIG. 1 shows a downhole hybrid type cable that includes a metal tube with copper wire wrapped around the tube and an insulation layer around the copper wire, where the metal tube is not preformed.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

Figure 2:
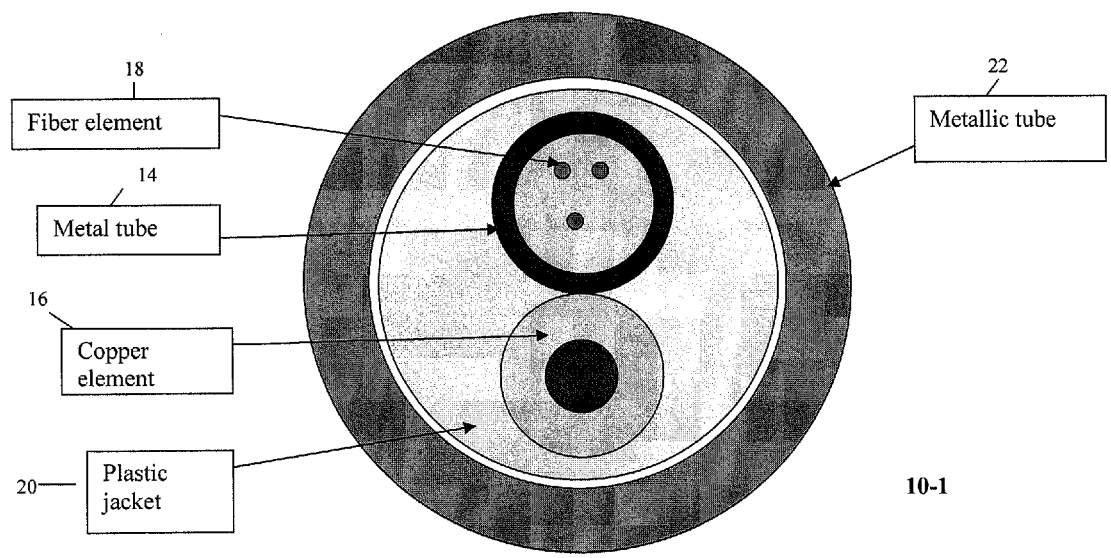
FIG. 2 shows a cross-section of a down hole cable according a first exemplary embodiment of the present invention.
Figure 3:
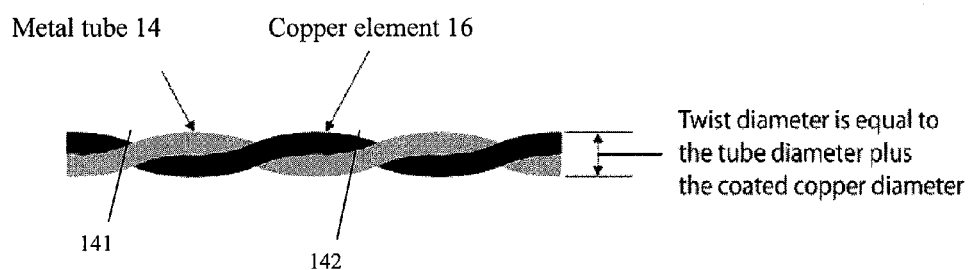
FIG. 3 shows a side view of the metal tube and the copper element stranded in the helical spaces formed in the metal tube during a method of manufacturing the down hole cable of the first exemplary embodiment of the present invention.

A down hole cable according to an exemplary embodiment of the present invention, and a method of manufacturing the down hole cable of this exemplary embodiment, will be described with reference to FIG. 2 and FIG. 3. FIG. 2 shows a cross-section of a down hole cable according the first exemplary embodiment of the present invention.

The downhole cable 10-1 illustrated in FIG. 2 includes a metal tube 14, and the copper element 16, and the jacket 20 and a metallic tube 22. As shown in FIG. 2, the metal tube 14 has a fiber element 18 housed therein. FIG. 3 shows the metal tube 14 of FIG. 2 with a helical shape (141, 142) in a outer circumferential area thereof, and a copper element 16 disposed in the helical space formed by the metal tube.

In this exemplary embodiment, the metal tube 14 is a fiber gel filled stainless steel tube, with a 0.079" diameter. However, the metal tube 14 may be made of Incoloy 825, Inconel 625, or any other metal types.

The copper element 16 is a copper wire, which is a 18 American Wire Gauge (AWG) conductor, having a 0.076" diameter. The jacket 20 may be a plastic extrusion that can be placed on a top end of the metal tube 14 and the copper element 16. In this exemplary embodiment, the jacket 20 has a 0.169" diameter, but the jacket 20 is not limited to this diameter.

The core, i.e., the metal tube 14 and the copper element 16, is put into the metallic tube 22. The metal tube 22 may be made of Incoloy 825, 316 stainless steel (SS) or any other suitable metal. The wall thickness of the metallic tube 22 can vary depending on desired requirements of a customer. Common wall thicknesses are 0.028", 0.035" and 0.049", but the present invention is not limited to these wall thicknesses. The metallic tube 22 in FIG. 1 has a ¼" diameter. The core goes into the ¼" metallic tube with a 0.035" wall thickness. However, the core is not limited to these thicknesses. As would be obvious to a skilled artisan, the present invention can be adapted for the other wall thicknesses. In this exemplary embodiment, the down hole cable is for a fixed installation.

Figure 4:
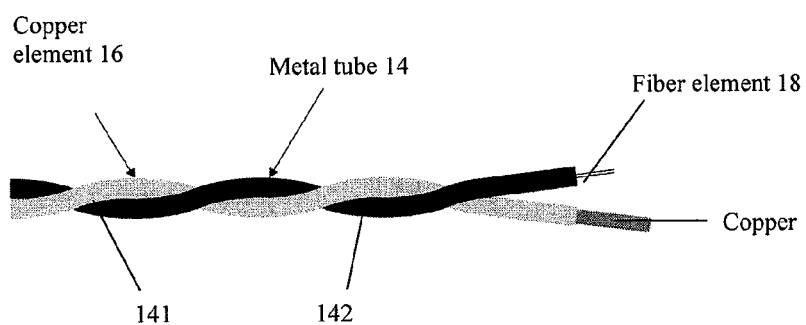
FIG. 4 shows another side view of the metal tube and the copper element being twisted on center in the stranding process during the method of manufacturing the down hole cable of the first exemplary embodiment of the present invention.
Figure 5:
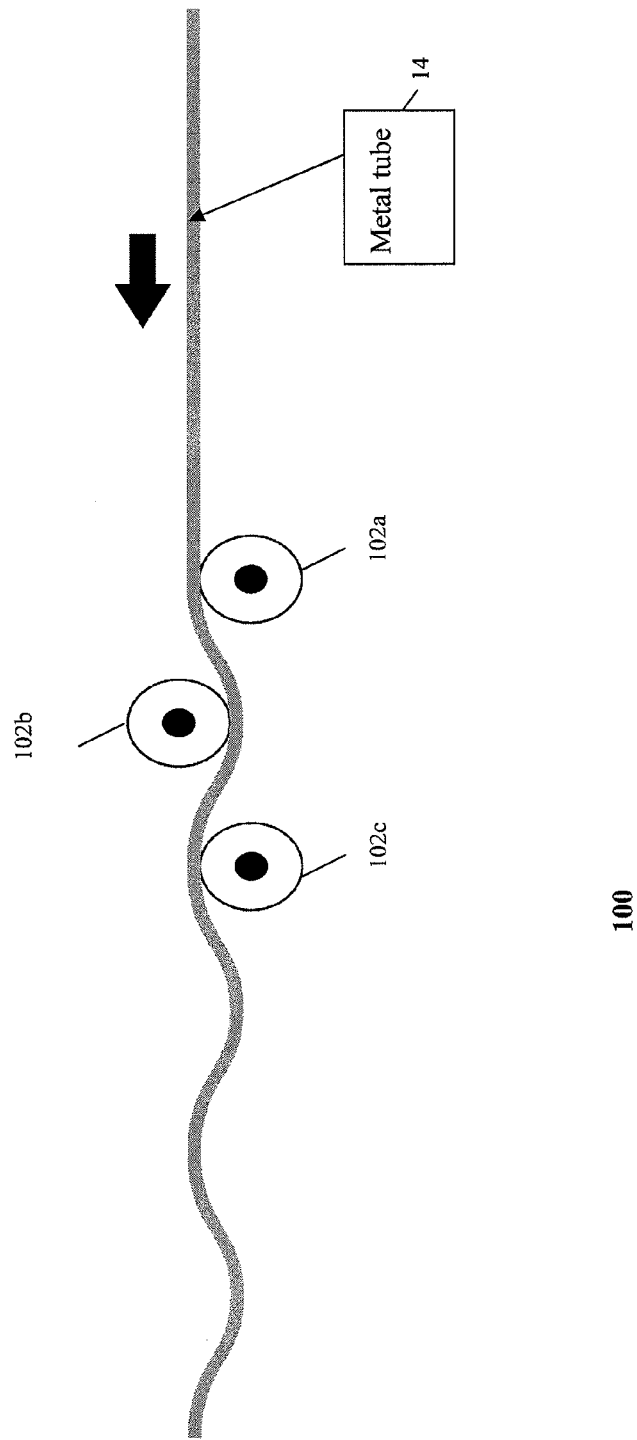
FIG. 5 shows a preformer forming the helical shape in the outer circumferential surface of the metal tube.

Next, an exemplary method of manufacturing the downhole cable shown in FIG. 2 is described with reference to FIGS. 2-5. A coated copper element 16 and the metal tube 14 are put on a stranding machine. Stranding machines are well known in the art. The copper element 16 and the metal tube 14 are on payoffs that control the tension of each element to ensure consistency in the stranding process. These two elements are routed from their payoffs to the point where they come together. At this point, as shown in FIG. 5, a preformer 100 is located that the metal tube 14 goes through. This preformer 100 is used for imparting a permanent helical bend in an element so it retains this shape in the cable structure. In the most common type of a preformer 100, it is a series of three rollers (102a, 102b, and 102c) that a subject element (the metal tube 14) will pass through with the ability to adjust the distance from the first (102a) to the third roller (102c) while the second roller (102b) can be adjusted to create an offset required to get the desired curvature of the subject element, in this case, the metal tube 14. As shown in FIGS. 3 and 4, a helical shape 141,142 is formed in an outer circumferential surface of the metal tube 14 in the preforming process by the rollers 102a, 102b, and 102c.

The effectiveness of subsequently stranding the copper element 16 and the metal tube 14 together is crucially dependent on the accuracy of preforming the stainless metal tube 14. A high level of precision is required in the preforming process to ensure that the copper element 16 and the metal tube 14 are stranded uniformly, as shown in FIG. 3. The resultant diameter of the two stranded elements has a typical variation of <0.004". This variation is an exemplary, non-limiting variation, and the present invention does not require this variation as a firm requirement for the stranded copper element 16 and the metal tube 14 to be inserted inside the metallic tube 22. The metallic tube 22 may allow for greater variation. To achieve this level of variation, the tension control of the two elements must be very tight and very low and be able to control the tension on the two elements individually. In the exemplary embodiment shown in FIG. 3, preforming the metal tube 14 and stranding the copper element in a helical shape formed by the metal tube 14 results in a twist diameter Dt' equal to a diameter D14 of the metal tube 14 plus the diameter D16 of the copper element 16. That is, Dt'=D14+D16. Therefore, according to this exemplary embodiment of the present invention, the twist diameter Dt' is reduced by one diameter length D16 of the copper element 16 as compared to stranding the copper element 6 to a metal tube 4 that did not go through the preforming process, as shown in FIG. 1.

In particular, as shown in FIG. 1, a resulting twist diameter Dt (after the copper wire 6 is wrapped around the stainless steel tube 4 which has not been preformed, is equal to a diameter D4 of the steel tube 4 plus two times the diameter D6 of the coated copper wire 6. That is, Dt=D4+2×D6. As such, if the metal tube 4 is not preformed, the core will need to be inserted into a bigger outer metal tube, thereby increasing manufacturing costs.

As the tension varies the quality of the helical shape 141, 142 formed in the metal tube 14 will degrade which will make the resultant diameter vary. This is critical due to the need for the stranded copper element 16 and the metal tube 14 to be inserted into the metallic tube 22 and being able to slide inside the tube 22 with minimal effort. If the helical shape 141,142 formed in the metal tube 14 is not properly formed, that is, either the metal tube 14 is over preformed (helix diameter is too large) or the preform is too small (resulting in an essentially straight steel tube with the copper wire wrapped around it), the two elements will be forced into position during the process of putting them into the metallic tube 22. This results in undesired compression and strain on the copper element 16 and the metal tube 14, which can compromise the performance characteristics of the copper element 16 and the fiber 18 housed in the metal tube 14.

In this exemplary embodiment, the tension for each element (the copper element 16 and the metal tube 14) was kept different to achieve the same strain in each element. This is because in a post processing stage, when the copper element 16 and the metal tube 14 are in a relaxed state or non-tensioned state, the two elements will relax by the same amount so the resulting linear length of these elements are the same. If this was not done, the element that had a lower strain with respect to the other element would flex out of position to absorb the resultant compression imparted from the higher strained other element. This can result in processing issues during the process to add a plastic jacket 20 to the two elements and in putting the two elements into the metallic tube 22. If an element among the copper element 16 and the metal tube 14 had a lower strain with respect to the higher strained element, the lower strained element can flex out of position and can be damaged in a number of ways. For example, it may get caught on production equipment or folding over itself, especially with the copper wire.

After the metal tube 14 is preformed, it continues to what is called the closing point where the copper element is also routed. As shown in FIG. 4, since the copper element 16 is significantly less stiff than the stainless metal tube 14, the copper element 16 will conform to the helix of the stainless steel tube. In other words, the metal tube 14 and the copper element 16 are twisted concentrically on center as shown in FIG. 4. After this point, the two elements, which are now stranded together, are routed to the takeup of the machine.

In this exemplary embodiment, each of copper element 16 and the metal tube 14 have a diameter of approximately 0.078" in diameter. After these two elements are stranded together, they then get a plastic extrusion 20 over them to hold them together. This plastic is not required in the exemplary embodiment, but can be provided as an optional feature. The diameter over the extrusion is approximately 0.171". This structure then goes into, e.g., the ¼" metallic tube 22 with a wall thickness of 0.035" so the resultant inside diameter of the ¼" metallic tube is 0.180". The structural dimensions are not critical and can be adjusted to other element sizes ,i.e. different copper element 16 and fiber filled stainless metal tube 14 dimensions, and the outer tube 22 does not need to have a ¼" diameter nor a 0.035" wall thickness.

Next, a double-tube downhole cable according a second exemplary embodiment of the present invention, and a method of manufacturing the double-tube downhole cable will be described with reference to FIG. 6.

Figure 6:
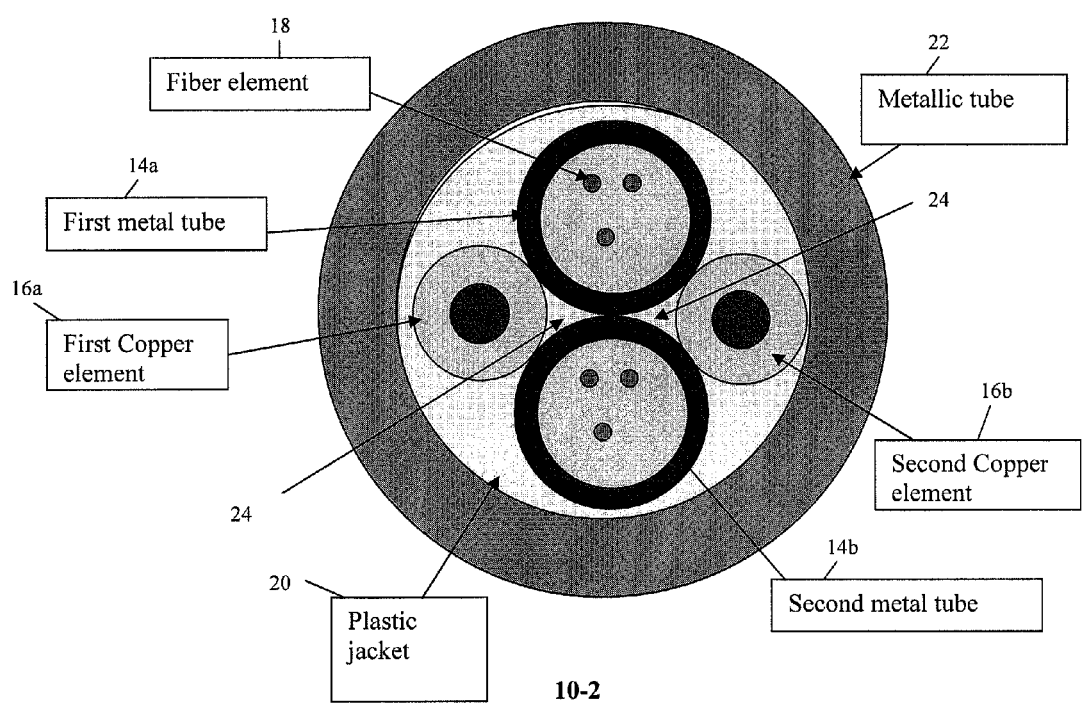
FIG. 6 shows a cross-section of a double-tube down hole cable according a second exemplary embodiment of the present invention.

FIG. 6 shows a cross-section of a double-tube down hole cable 10-2 according the second exemplary embodiment of the present invention.

As shown in FIG. 6, the downhole cable 10-2 includes a first metal tube 14a, a second metal tube 14b, wherein both the first metal tube 14a and the second metal tube 14b have the fiber element 18 housed therein. The downhole cable 10-2 further includes a first copper element 16a and a second copper element 16b.

As shown in FIG. 6, the second metal tube 14b is positioned parallel to the first metal tube 14a. A first circumferential surface of the first metal tube 14a is in contact with a second circumferential area of the second metal tube 14b. The first and second copper elements (14a and 14b) are disposed in interstitial areas 24 of the first metal tube 14a and the second metal tube 14b.

The plastic jacket 20 holds the first metal tube 14a, the second metal tube 14b, the first copper element 16a, and the second copper element 16b are held together by the plastic jacket 20. This combination can then be inserted into the metallic tube 22, similar to the downhole cable illustrated in FIG. 2.

The characteristics of the first metal tube 14a, the second metal tube 14b, the first copper element 16a, the second copper element 16b, the plastic jacket 20, and the metallic tube 22 can vary as discussed above with respect to FIG. 2. For example, in this exemplary embodiment, the copper element 16 can be a 21 AWG conductor. The diameter of the first metal tube 14a, and the second metal tube 14b can be 0.046", but is not limited to this limitation.

To manufacture the double-tube downhole cable 10-2 shown in FIG. 6, the first metal tube 14a, the second metal tube 14b, the first copper element 16a, and the second copper element 16b are stranded together at the same time. Each of the elements 14a, 14b, 16a, and 16c are placed on a stranding machine. At the point where these elements would come together, tooling in the stranding machine is designed to control desired positions of the subject elements. Once the first metal tube 14a, the second metal tube 14b, the first copper element 16a, and the second copper element 16b are in the desired positions, i.e., the first metal tube 14a and the second metal tube 14b are in contact with each other, and the first copper wire 16a and the second copper wire 16b are situated in the interstitial areas of the first metal tube 14a and the second metal tube 14b, they are stranded together to form the core. This stranding method is called planetary stranding where the individual elements are stranded in such a way that they are not twisted on their own axis but are wrapped with the other elements Unlike the cable 10-1 of the first exemplary embodiment shown in FIG. 2, in the double-tube cable 10-2 of this exemplary embodiment, the metal tube 14a and the second metal tube 14b do not have to go through the preforming process shown in FIG. 5. The preforming of the first metal tube 14a and the second metal tube 14b can be an optional feature. Preforming the first metal tube 14a and the second metal tube 14b is not needed when the tube 14a and the tube 14b have the same characteristics. As these components 14a, 14b, 16a, and 16c are helixed, they twist on center, resulting in a uniform twisting. Therefore, in this case, the diameters of the first copper element 16a and the second copper element 16a would not contribute to the diameter of the resultant diameter of the stranded components (14a, 14b, 16a, and 16b), since they are placed in helical interstitial spaces of the first metal tube 14a and the second metal tube 14b, during the stranding process.

Next, the third exemplary embodiment of the present invention will be described with reference to FIG. 7.

Figure 7:
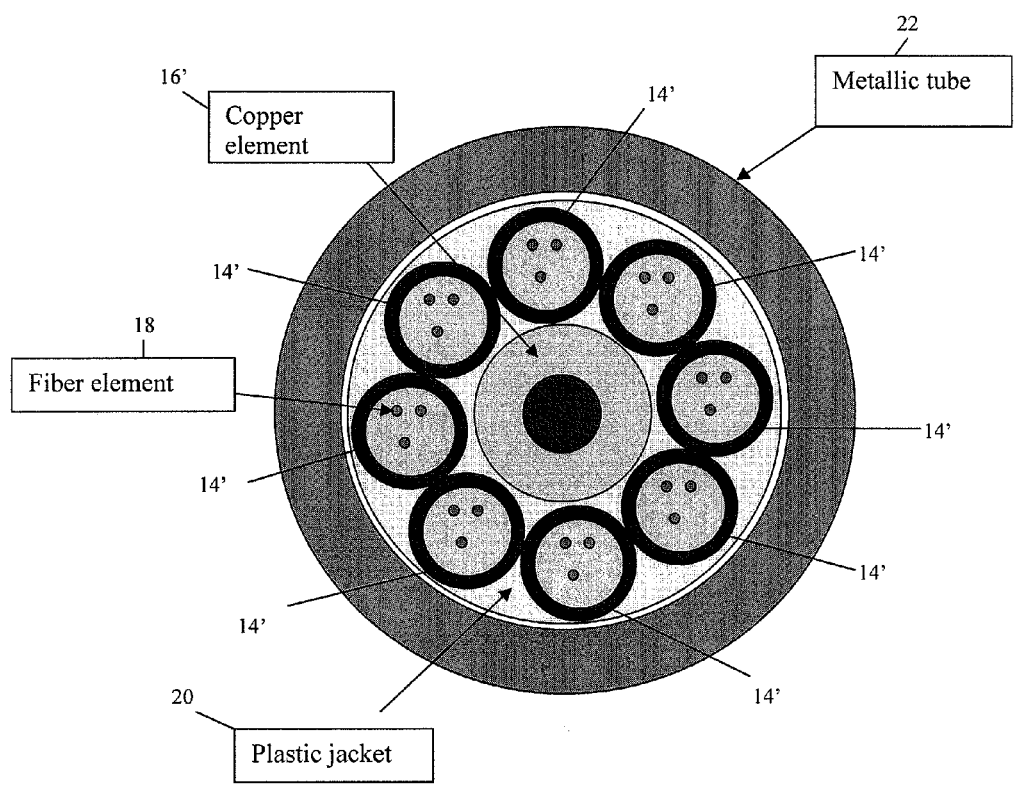
FIG. 7 shows a cross-section of a multi-tube down hole cable according a third exemplary embodiment of the present invention.

FIG. 7 shows a multi-tube downhole cable 10-3. The cable 10-3 includes a copper element 16' and multiple metal tubes 14' stranded together with the copper element 16'. The plastic jacket 20 can be put over the stranded elements (16',14') to hold the elements together, to form a core. Subsequently, this core can be inserted into the metallic tube 22.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of manufacturing a cable, the method comprising:
    stranding one or more copper elements in a helical space in an outer circumferential surface of a metal tube,
    wherein the helical space and the metal tube are in a same plane when viewed from a cross-section of the cable along a longitudinal axis of the cable.

2. The method according to claim 1, wherein the metal tube is a fiber gel filled stainless metal tube.

3. The method according to claim 1, wherein the stranding the one or more copper elements in the helical space of the metal tube comprises stranding the one or more copper elements such that respective outer surfaces of the one or more copper elements are in contact with the outer circumferential surface of the metal tube where the helical space is located.

4. The method according to claim 1, wherein the cable does not have a central element.

5. A cable comprising:
    a metal tube; and
    one or more copper elements stranded in a helical space in an outer circumferential surface of the metal tube,
    wherein the helical space and the metal tube are in a same plane when viewed from a cross-section of the cable along a longitudinal axis of the cable.

6. The cable according to claim 5, wherein the metal tube is a fiber gel filled stainless metal tube.

7. The cable according to claim 5, wherein the one or more copper elements are stranded in the helical space such that respective outer surfaces of the one or more copper elements are in contact with the outer circumferential surface of the metal tube where the helical space is located.

8. The cable according to claim 5, wherein the cable does not have a central element.

* * * * *